March 26, 1963 J. HORVATH 3,082,568
DRAUGHTING DEVICE
Filed Feb. 10, 1960 2 Sheets-Sheet 1
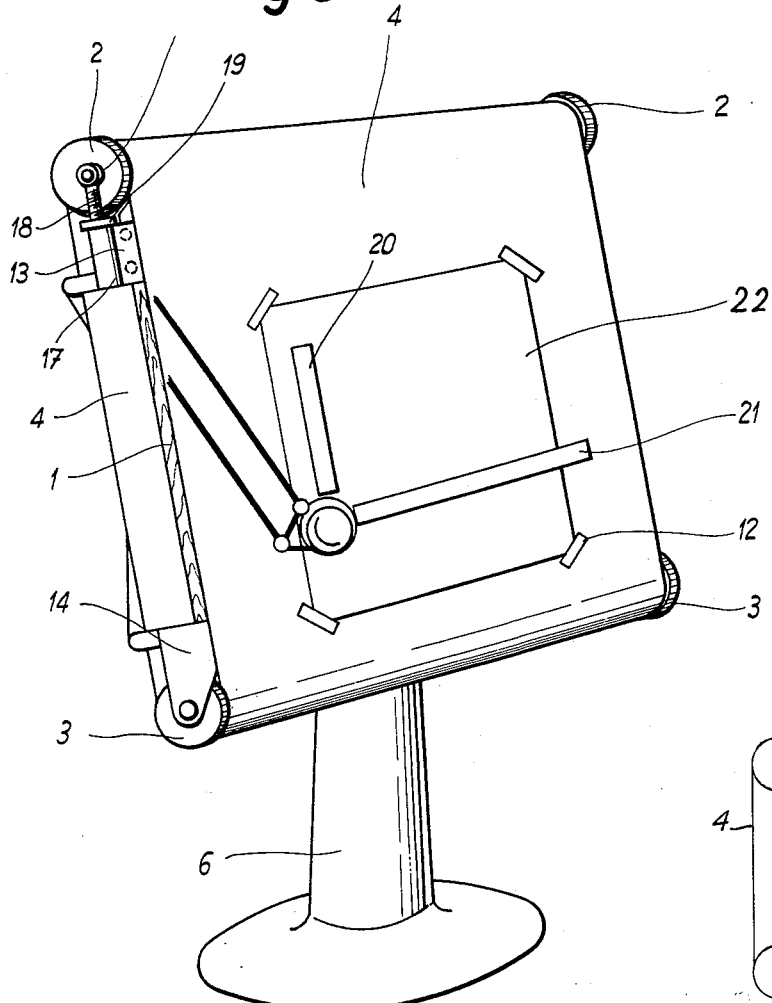
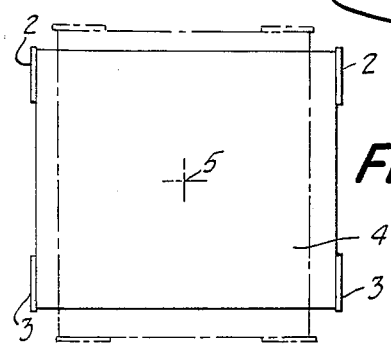
INVENTOR:
JOSEF HORVATH
By:
Watson, Cole, Grindle & Watson
ATTORNEYS March 26, 1963 J. HORVATH 3,082,568
DRAUGHTING DEVICE Filed Feb. 10, 1960 2 Sheets-Sheet 2

INVENTOR:
JOSEF HORVATH

By:
Watson, Cole, Grindle & Watson
ATTORNEYS

3,082,568
DRAUGHTING DEVICE
Josef Horvath, Brühlstrasse, Reiden, Lucerne, Switzerland
Filed Feb. 10, 1960, Ser. No. 8,476
Claims priority, application Switzerland Feb. 19, 1959
1 Claim. (Cl. 45—131)

This invention relates to a drawing device and has for one of its objects novel means to mount the board so that it shall be fully adjustable and rotatable around a central axis.

In order that the invention may be readily understood, certain preferred embodiments thereof are described below, by way of example, in conjunction with the accompanying drawings, in which:

FIGS. 1 and 2 show diagrammatically in side view and front view a drawing device with an endless band movable vertically and horizontally over a drawing-board;

FIG. 3 is a perspective view of the device according to FIGS. 1 and 2;

Figures 4, 5:
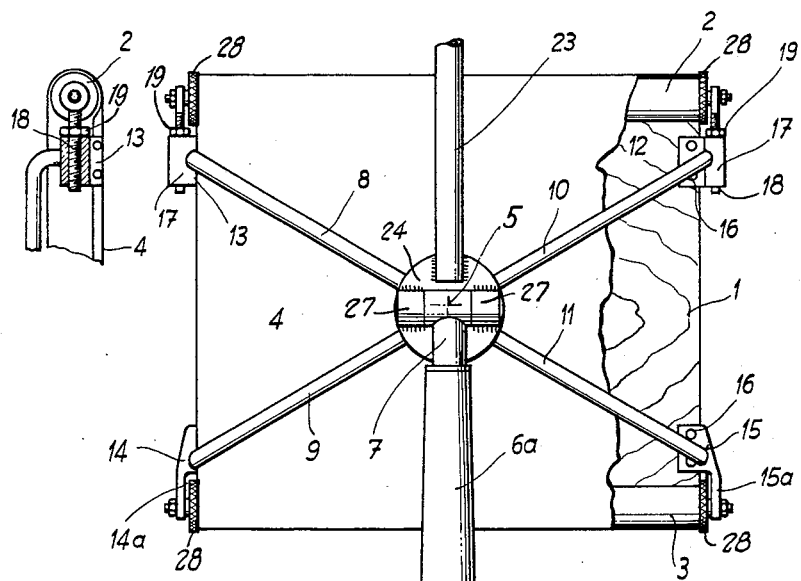
FIG. 4 is a rear elevation of the device according to FIG. 3.
FIG. 5 is a side view partly in section showing a detail of the embodiment according to FIG. 4.

The drawing device according to FIGS. 1 and 2 includes a drawing-board 1 which can be rotated in its plane about its own axis 5 and having rollers 2 and 3 associated therewith at its upper and lower edges respectively (full lines in FIG. 2). An endless band 4 of paper or the like passes over the rollers 2 and 3, which project laterally beyond the edge of the band 4, so that they can be gripped and turned. The endless band 4 is movable vertically. The rollers 2 and 3 turn round the endless band 4 which is in the form of drawing-paper or of an underlay for a sheet of drawing-paper. The rollers 2 and 3 have sidewalls 28 to guide the band 4.

Figure 6:
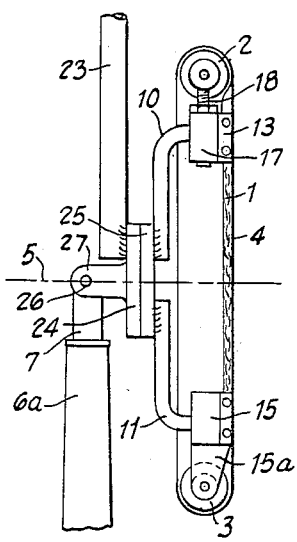
FIG. 6 is a side view of the device according to FIG. 3.

The embodiment according to FIGS. 5 and 6 corresponds to that of FIGS. 1 and 2. Because the drawing-board, together with the rollers 2 and 3 and the endless band 4 passing thereover, is rotatable in its own plane about the axis 5, the endless band 4 is movable horizontally too (dash-dotted lines in FIG. 2). The drawing-board 1 can be fixed in any desired position. Notches (not shown) may be provided in a bearing supporting the drawing-board 1 on a stand, in which notches the drawing-board 1 can be caught and held in preferred positions, by being biassed by a spring (not shown).

In the embodiment according to FIGS. 1 and 2, shown in more detail in FIGS. 3, 4, 5 and 6, the drawing-board 1 is mounted on a stand 6. In the upper part 6a of the stand 6, a rod 7 can be moved up and down and fixed in any desired vertical position by an arrangement not shown. The free end of the rod 7 has fixed thereto a cross of struts 8, 9, 10 and 11, FIG. 4. The free ends of the struts 8, 9, 10 and 11 have clips 12, 13, 14 and 15 fitted thereon to fix the drawing-board 1 and to form the end bearings of the reversing rollers 2 and 3. The lower clips 14 and 15 are fixed on the drawing-board 1 by pins or screws 16 and each has an arm 14a, 15a serving as an end bearing for the axle of the turn round-roller 3. The upper clips 12 and 13 are constructed somewhat differently to the clips 14 and 15. Each of the clips 12 and 13 has an eye 17 in which a bolt 18 can be screwed in and out, its upper end forming the bearing for the axle of the roller 2. A lock nut 19 on each bolt 18 serves for adjusting the tension of the band 4 passing over the rollers 2 and 3.

The rollers 2 and 3 project beyond the endless band 4 and, at these places, they are provided with a milled or knurled end, so that they can be easily turned to move the band 4.

As shown in FIG. 3, the endless band 4 is utilized as an underlay for a sheet of drawing-paper 22 which is stuck thereon for example by adhesive strips.

The parallel guiding linkage of a pair of rulers 20 and 21 is fixed on the stand 6 of the unit. For this purpose a strut 23 (FIG. 4) may be used.

FIG. 4 shows the means for holding the drawing-board 4 on the stand 6 by means of stay members arranged in crosswise relationship. The bearing brace for the rod 7 is mounted between lugs 27, FIG. 6, which are secured on a disc or plate 24 and this disc 24 carries the strut 23. The disc 24 is rotatable around a bearing bolt 26 on the stand 6 and the two bearing lugs 27 are mounted on the rod 7. Against the disc 24 there is provided a second disc 25 on which the cross struts 8, 9, 10 and 11 are secured rotatable in the axis 5. Thus the drawing board together with the cross struts 8, 9, 10 and 11 and the disc 25 may be rotated adjacent the disc 24 together with the strut 23.

Within the scope of the invention, it is possible to modify the drawing device described above in conjunction with the drawings. For example, the band 4 may be led from a winding-off roller over the drawing-board to a winding-on roller. Alternatively, more turn-round-rollers than the rollers 2 and 3 can be provided. Furthermore, the guiding and conveying rollers for the band may be actuable, not by hand, but mechanically, for example by a pedal.

The merits of the drawig device are essentially as follows:

The portions of the sheet of drawing-paper to be drawn on can be brought into the position as desired by the draughtsman, whether the band itself is used or a sheet of drawing-paper 22 or several sheets of drawing-paper fixed on the band, so that all the work can be carried out at eye level, with the draughtsman seated. The whole available surface of the drawing is considerably greater than that of known drawing-boards, at least twice as great as the drawing surface of the drawing board 1 alone which is particularly important for the general arrangements of working drawings. The space taken up by the drawing device in question is much less than in the case of ordinary drawing-boards or tables, because the drawing-board is very long, if a drawing-paper with a surface of drawing by twice of the surface of the drawing-board is needed. With the present drawing device, small parallel guides with small scales and rulers can be used, although a drawing with twice surface of the surface of the drawing-board is stretched.

I claim:

A drawing device comprising a drawing board acting as an underlay, a roller at one side of the board, a second roller at the oposite side of the board, an endless band arranged between the rollers, means for mounting the drawing board with the rollers to be rotatable in its own plane about an axis perpendicular thereto and adapted to be held fixed in any desired position, a stand for the board, clips secured to the sides of the board one adjacent each end of both rollers and each having means to serve as end bearing for the respective roller, and linkage in the form of struts fixed on the stand and connected to the clips to rotatably support the drawing board.

References Cited in the file of this patent

UNITED STATES PATENTS

| | | |
|---|---|---|
| 1,896,923 | Tevonian | Feb. 7, 1933 |
| 2,632,975 | Klabunde | Mar. 31, 1953 |
| 2,641,082 | Stults | June 9, 1953 |
| 2,703,468 | Sheinwald | Mar. 8, 1955 |
| 2,894,355 | Huff | July 14, 1959 |
| 2,896,366 | Van Derdys | July 28, 1959 |
| 2,898,702 | Pignone | Aug. 11, 1959 |
| 2,979,823 | Little | Apr. 18, 1961 |

FOREIGN PATENTS

| | | |
|---|---|---|
| 307,497 | Italy | May 3, 1929 |